T. HARRINGTON.
VESSEL COVER.
APPLICATION FILED APR. 15, 1921.

1,411,093.

Patented Mar. 28, 1922.

Tillie Harrington
INVENTOR

BY Victor J. Evans
ATTORNEY

WITNESS:

UNITED STATES PATENT OFFICE.

TILLIE HARRINGTON, OF MINNEAPOLIS, MINNESOTA.

VESSEL COVER.

1,411,093.

Specification of Letters Patent. Patented Mar. 28, 1922.

Application filed April 15, 1921. Serial No. 461,525.

*To all whom it may concern:*

Be it known that I, TILLIE HARRINGTON, a citizen of the United States, residing at Minneapolis, in the county of Hennepin and State of Minnesota, have invented new and useful Improvements in Vessel Covers, of which the following is a specification.

This invention relates to means for holding a cover on a cooking utensil, the principal object of the invention being to provide means for permitting the utensil to be tilted to drain fluid therefrom without having to hold the cover in place by the hand.

Another object of the invention is to provide means whereby the cover can be easily and quickly removed or replaced.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

As shown in these views the device consists of a split ring 1, made of wire or the like and having its ends extended, as at 2, to form a handle and means for expanding and contracting the ring. Spring fingers 3, of curved shape, are secured to the ring at spaced intervals, said fingers extending inwardly, as shown.

Figure 1:
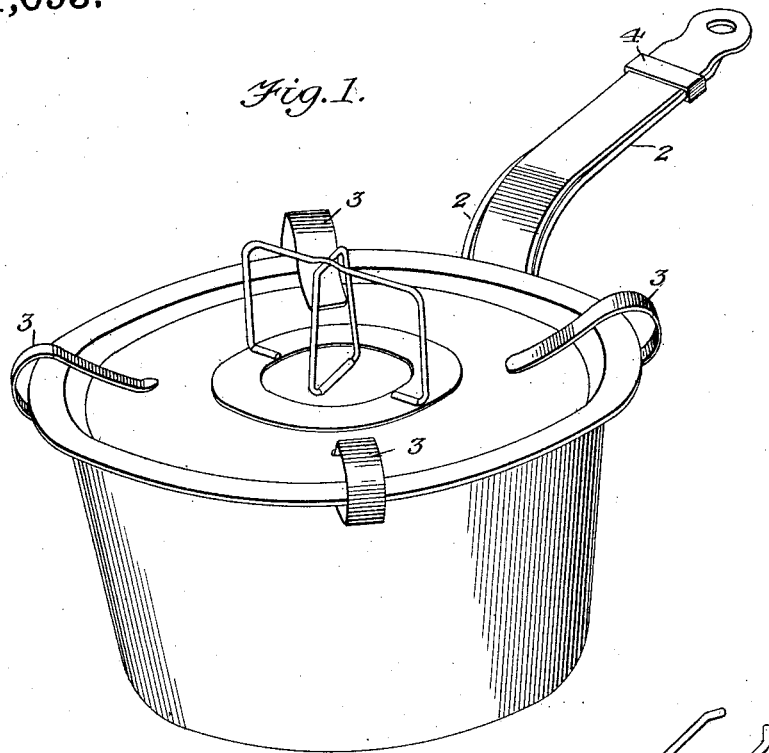
Figure 1 is a view of a cooking utensil with its cover held on by a device made in accordance with my invention.
Figure 2:
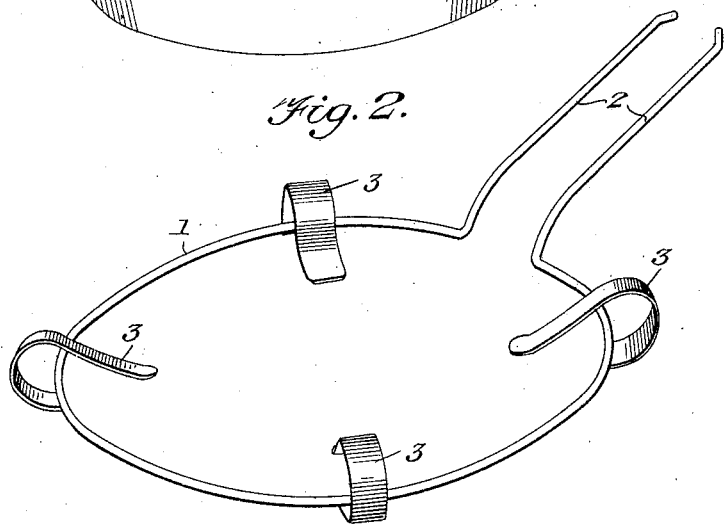
Figure 2 is a view of the device itself.

As shown in Figure 1 the split ring engages the upper edge of the utensil immediately under the curved edge thereof, with its fingers pressing upon the lid so as to hold the lid upon the utensil. The handle extends along the handle of the utensil and the two parts of the handle are held with the device in contracted condition and upon the handle of the utensil by the clip 4, this clip slipping over the two handles, as shown.

It will of course be understood that if the device is used upon a utensil without a handle, the handle of the device will serve as a handle for the utensil.

In placing the device in position the ring is expanded and placed over the cover and the top of the utensil so that the ring will grip the bead of the utensil with the fingers engaging the cover. This will permit the utensil to be tilted so that the water will drain therefrom and it will not be necessary to hold the top in place by the hand.

The device can also be used for draining juices from fruits and the like where slow draining of the juice is necessary in order to secure all the juice. With my device the utensil can be tilted to a position where the juice will pass between the upper edge of the utensil and the cover as fast as it leaves the fruit.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device for holding covers upon utensils comprising a split ring having its ends extended to form a handle and curved fingers secured to the ring and adapted to engage the cover.

2. A device for holding covers upon utensils comprising a split ring having its ends extended to form a handle, curved fingers secured to the ring and adapted to engage the cover and a clip for holding the extensions forming the handle with the ring in contracted condition.

In testimony whereof I affix my signature.

TILLIE HARRINGTON.